Sept. 13, 1960 F. H. LEHMAN 2,952,739

HANDS-FREE TELEPHONE SUPPORT

Filed May 14, 1959 2 Sheets-Sheet 1

INVENTOR
FRANCIS H. LEHMAN
BY
Borst and Borst
ATTORNEYS

Sept. 13, 1960 F. H. LEHMAN 2,952,739

HANDS-FREE TELEPHONE SUPPORT

Filed May 14, 1959 2 Sheets-Sheet 2

INVENTOR
FRANCIS H. LEHMAN
BY
Borst and Borst
ATTORNEYS 2,952,739
Patented Sept. 13, 1960

2,952,739

HANDS-FREE TELEPHONE SUPPORT

Francis H. Lehman, 1255 North Ave., New Rochelle, N.Y.

Filed May 14, 1959, Ser. No. 813,162

2 Claims. (Cl. 179—1)

This application relates to two way amplifiers for combined receiver and transmitter hand telephones.

While there are known devices for amplifying both the incoming and outgoing intelligence conveyed by telephone, they have not gained wide acceptance. This is true primarily because the cost of manufacture of two way telephone amplifiers is high. It has been found, however, that the need for an efficient amplifier at the microphone or transmitting side of telephones is not nearly so great as that for an efficient amplifier at the receiving side. The two way telephone amplifier has, for example, occasionally led to the holding of telephone conferences at business meetings and it has been the experience at such conferences that few will talk while many will listen and that the few who are delegated to talk can be positioned sufficiently near to the telephone as not to require high amplification at that side; hence efficient amplification of the incoming signal is deemed to be more important than amplification of the outgoing signal of the telephone. The telephone amplifier which is made in accordance with this invention, therefore, provides an efficient receiver amplifier, which is electronic and preferably transistorized, and a less efficient but inexpensive transmitting amplifier predicated purely on principles of mechanical construction and sound collecting. To this end the instant amplifier is in effect a cradle which supports a hand telephone in such a way as to cause its receiver to be coupled to an amplifier circuit housed by the cradle and at the same time to allow the telephone microphone to be disposed in physical juxtaposition to a specially designed sound collecting or gathering surface provided in the amplifier casing.

One object of the invention is to provide a new and improved two way amplifier for hand telephones which is useful and sufficiently efficient for most purposes and is relatively inexpensive to manufacture.

Other objects and advantages of the invention may be appreciated on reading the following detailed description which is taken in conjunction with the following drawings, in which—

Figure 1:
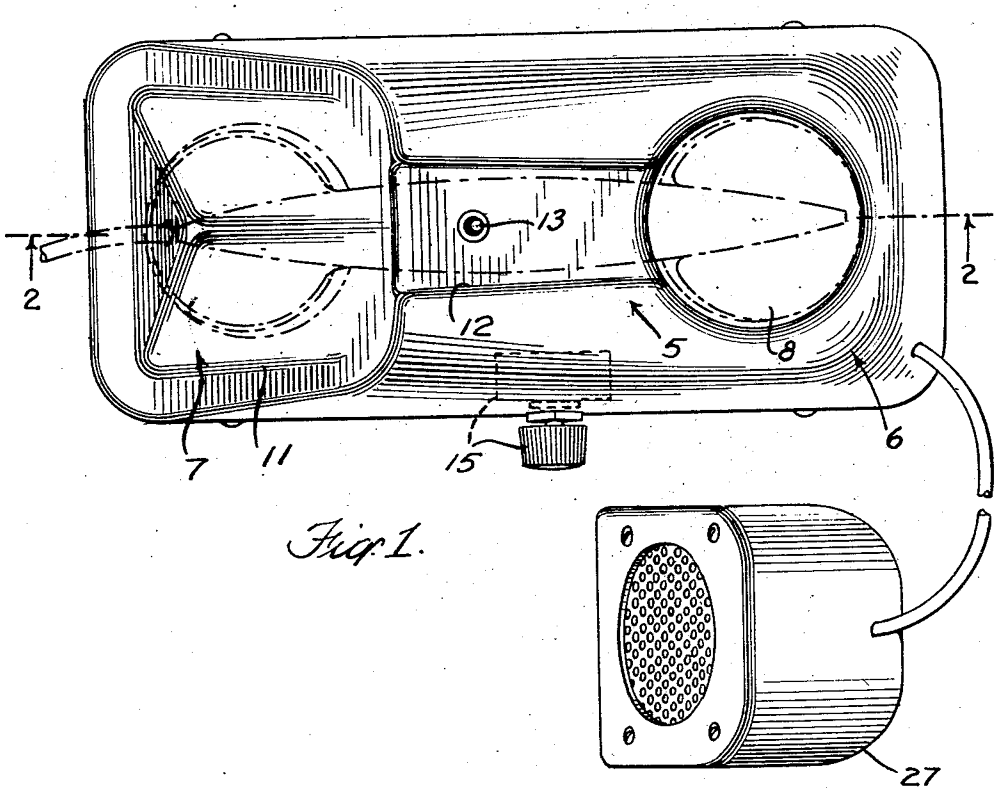
Fig. 1 is a plan of the telephonic amplifier and speaker.
Figure 2:
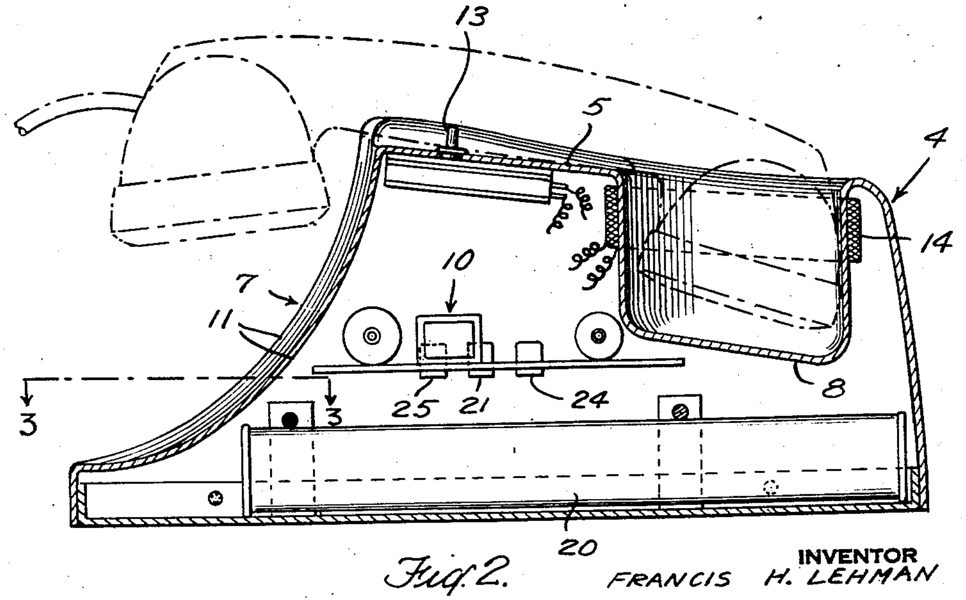
Fig. 2 is a vertical section taken on line 1—1 of Fig. 2.

Referring to the drawings, the casing 4 of the telephone cradle 5 is apportioned into a receiving section 6 and a transmitting section 7. The receiving section comprises a well 8 formed in the top surface of the cradle and adapted to receive the receiver of the telephone in magnetic coupling position with respect to an amplifier circuit 10 disposed within the casing.

Figures 3, 4:
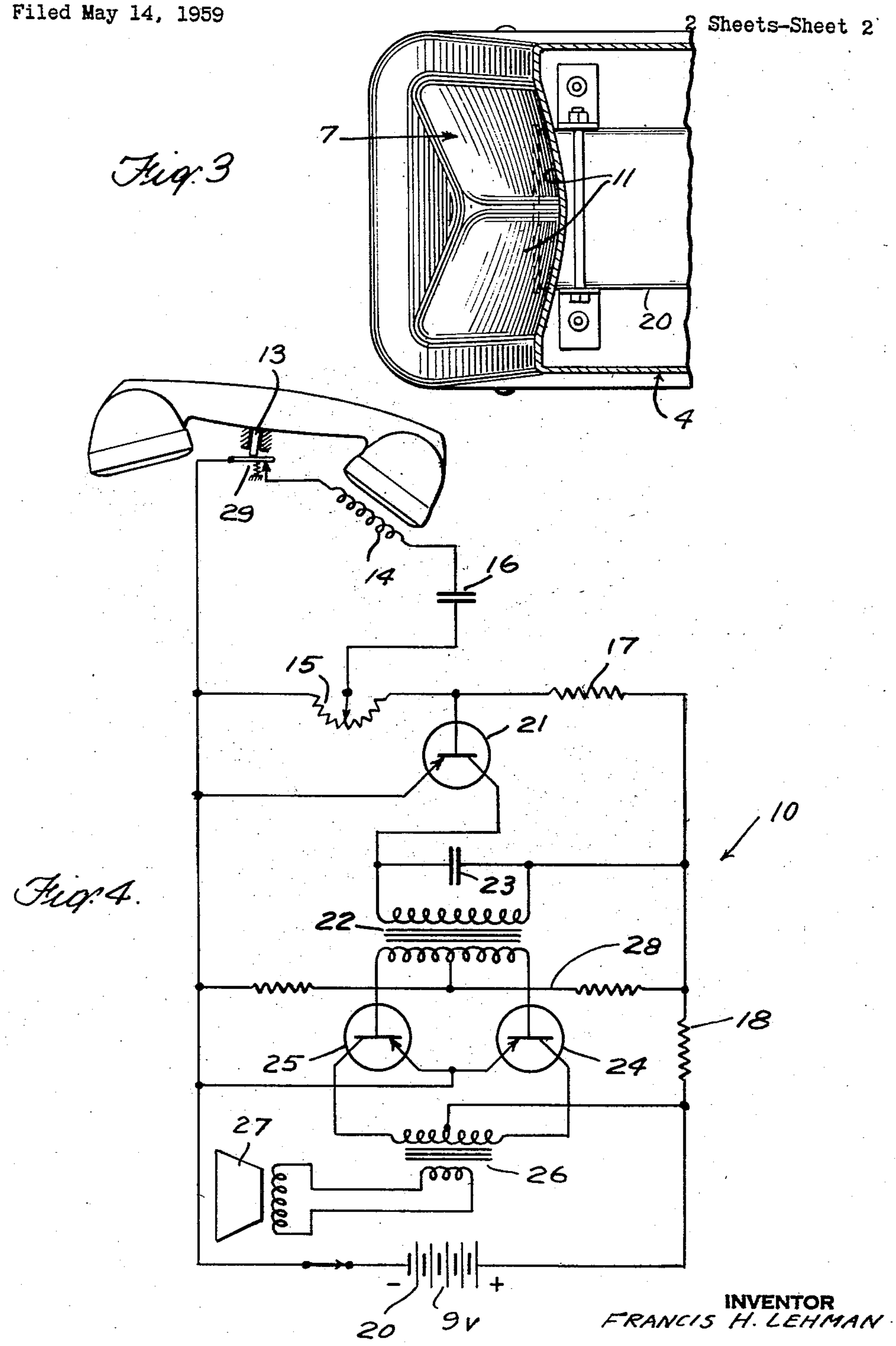
Fig. 3 is a fragmentary view of the sound collecting casing surface taken on line 3—3 of Fig. 2.
Fig. 4 is a wiring schematic of the transistorized amplifier.

The transmitting section 7 comprises a three dimensional surface 11 formed in the front end wall of the cradle casing over which the telephone microphone is suspended. The surface 11 is concave and preferably approximately parabolic, as shown, being considerably longer in its vertical axis than in its horizontal axis. This surface occupies the entire front wall and is shaped as a somewhat modified parabolic surface, the vertical central axis terminating to the rear of the front edge of the casing and the cross sectional shape of the two halves being slightly curvilinear, as shown in Fig. 3, leaving an upwardly inclined triangular base for the surface. This has been found most effective in collecting the sound waves and directing them into the overhanging telephone mouth piece.

The surface 11 slopes rearwardly, its top being considerably to the rear of the front edge of the casing. Therefore, the top of the casing is considerably shorter than its bottom. The horizontal component of slope is such that the wall is completely underneath the mouth piece of a telephone hand set in place on the cradle. The surface 11 acts as a reflector condenser to collect the impinging sound waves and reflect them into the overhanging mouth piece.

The top wall of the casing is shown as generally horizontal but slightly rearwardly descending and between the well 8 and the surface 11 there is formed a groove 12 which is approximately horizontal and serves as the cradle portion to receive the body of the hand set, the bottom of the groove being slightly rearwardly descending so as to cause gravity to urge the hand set into position with the receiver and microphone components into proper relation with respect to the well 8 and the surface 11. An aperture in the groove 12 receives a spring biased push button 13 which serves normally to break the amplifier circuit and to make the circuit when the telephone is disposed in the cradle.

Referring to Fig. 4 the amplifier circuit schematically shown therein has a telephone coupling, induction coil 14 one side of which is connected through switch 29 to one side of potentiometer 15, its other side being connected through capacitor 16 to the tap of the potentiometer 15. The potentiometer 15 and series connected resistors 17, 18 are connected across a 9-volt battery source 20 the negative side of which is connected to the emitter electrode of transistor 21. The base electrode of the transistor 21 is connected to a point in the circuit between the potentiometer 15 and the resistor 17 and the transistor constitutes the first stage of amplification in the circuit.

The collector output of the transistor 21 is connected to one side of the primary winding of transformer 22, the other side of which is connected to the positive terminal of the battery source 20. A small capacitor 23 is disposed between the two sides of the primary winding of the transformer. The transformer 22 provides the second stage of amplification in the circuit.

Emitter coupled transistors 24 and 25 are connected in push pull fashion to the secondary winding of the transformer 22 which is center tapped by a voltage dividing conductor 28 and the transistors 24 and 25 constitute the third and final amplification stage in the circuit.

The primary of stepdown transformer 26 is connected across the collector electrodes of the transistors 24 and 25 and its secondary energizes a loudspeaker 27 which is connected thereacross.

The push button 13 which is adapted to be depressed by the telephone when it is inserted in the groove 12 of the cradle operates the make and break switch 29. When the push button 13 is thus depressed, the induction coil 14 is placed into the battery circuit and the transistorized amplifier is made operative.

Various modifications of the invention may be effected by persons skilled in the art without departing from the principle and scope of the invention as defined in the appended claims.

What is claimed is:

1. A two way telephone amplifier comprising a casing having a substantially horizontal top wall constituting a cradle for a telephone hand set with a well in its rear portion adapted to receive a receiver component of a telephone hand set and having a concave front wall extending from side to side of the casing and sloping rearwardly from the bottom front edge to the top of the casing and shaped to reflect and condense sound waves impinging upon it, the top wall having a longitudinally grooved portion connecting the well and the top of the front wall and adapted to receive the body portion of a telephone hand set in the groove with the receiver component in the well and the mouth piece overhanging the front wall in position to receive the said reflected and condensed sound waves, an amplifier circuit in the casing having a make and break switch and an induction coil disposed in magnetic coupling proximity to the bottom of the well, an aperture in the bottom of the groove, and a normally elevated switch button in the aperture in operative attachment to said make and break switch and adapted to be depressed by the telephone hand set and close the circuit when the hand set is on the cradle.

2. A two way telephone amplifier as defined in claim 1 in which the concave front wall is substantially parabolic and its horizontal component of slope is such that the wall completely underlies the mouth piece of a telephone hand set on the cradle.

References Cited in the file of this patent

UNITED STATES PATENTS 2,657,265 Branson ---------------- Oct. 27, 1953

Notice of Adverse Decision in Interference

In Interference No. 92,116 involving Patent No. 2,952,739, F. H. Lehman, Hands-free telephone support, final judgment adverse to the patentee was rendered Dec. 9, 1963, as to claim 1.

[*Official Gazette February 4, 1964.*]